United States Patent Office 3,631,059
Patented Dec. 28, 1971

3,631,059
PROCESS FOR THE EXTRACTION AND
PURIFICATION OF PILOCARPINE
John T. Goorley, 2313 Jasmine St., and Robert L. Holt, 913 Middleton St., both of Monroe, La. 71201
No Drawing. Filed Sept. 11, 1967, Ser. No. 666,950
Int. Cl. C07k 49/36
U.S. Cl. 260—309
7 Claims

ABSTRACT OF THE DISCLOSURE

This invention relates to a process for the extraction and purification of alkaloids and nitrogenous compounds from plant and animal tissue which comprises the steps of extracting plant and animal tissues having a low fat content with a dilute aqueous solution of an acid selected from the group consisting of strong mineral acids and strong organic acids having a concentration of between 0.1% to 10% by weight, neutralizing the aqueous acidic extract to a pH of between 5 to 13, contacting the neutralized aqueous extract with activated carbon, separating the carbon absorbate, extracting the alkaloids and nitrogenous compounds from said carbon absorbate with an extraction fluid selected from the group consisting of (1) a dilute aqueous solution of an acid selected from the group consisting of strong mineral acids and strong organic acids having a concentration of between 0.1% and 10% by weight and containing from 0% to 10% weight of an alkanol having from 1 to 6 carbon atoms and (2) an anhydrous organic solvent, and recovering said alkaloids and nitrogenous compounds in purified form.

THE PRIOR ART

In the usual processes for the extraction of alkaloids from plant tissues, the leaves, roots, bark or other starting material is reduced in particle size to facilitate better extraction. The material is then moistened with a dilute solution of a base such as aqueous ammonia, aqueous sodium hydroxide or aqueous sodium carbonate which converts the alkaloidal amine from its water soluble form to a free base which is soluble in such organic solvents as chloroform, petroleum hydrocarbons, ether, benzene or others. The alkali moistened plant tissue is then extracted with the organic solvent. Since large amounts of solvents are necessary to completely remove the alkaloids from the plant materials (for example, about eight tons of solvent are required for each ton of plants), manufacturers of alkaloids must recover most or all of the solvent to make the process economical. This operation requires expensive equipment and high operating costs. In the usual process of extracting alkaloids, the solvents containing the alkaloids must be distilled and recovered. The alkaloid is removed by such processes as counter-current extraction with acidulated water or complete solvent removal by distillation. Further separation and purification is dependent on the particular properties of the alkaloids that are being separated and purified.

It has also been proposed when extracting alkaloids from plant tissues containing cellulosic material to acidulate the plant tissue with small amounts of a concentrated acid, extract the color-bearing material by an organic solvent, alkalinizing the extracted material, re-extracting the alkalinized extracted material with an organic solvent and recovering the alkaloids (U.S. Pat. 1,447,400). This improvement also requires elaborate solvent recovery systems.

OBJECTS OF THE INVENTION

It is an object of the present invention to develop an economical process for the recovery of alkaloids and nitrogenous compounds from plants and animal tissues avoiding the use of large amounts of organic solvents.

A further object of the invention is the development of a process for the extraction and purification of alkaloids and nitrogenous compounds from plant and animal tissue which comprises the steps of extracting plant and animal tissues having a low fat content with a dilute aqueous solution of an acid selected from the group consisting of strong mineral acids and strong organic acids having a concentration of between 0.1% to 10% by weight, neutralizing the aqueous acidic extract to a pH of between 5 to 13, contacting the neutralized aqueous extract with activated carbon, separating the carbon absorbate, extracting the alkaloids and nitrogenous compounds from said carbon absorbate with an extraction fluid selected from the group consisting of (1) a dilute aqueous solution of an acid selected from the group consisting of strong mineral acids and strong organic acids having a concentration of between 0.1% and 10% by weight and containing from 0% to 10% by weight of an alkanol having from 1 to 6 carbon atoms and (2) an anhydrous organic solvent, and recovering said alkaloids and nitrogenous compounds in purified form.

Another object of the invention is the development of a process for the extraction and purification of alkaloids from plant tissues containing alkaloids which comprises the steps of extracting alkaloid-containing plant tissues having a fat content of less than 0.5% with a dilute aqueous solution of an acid selected from the group consisting of strong mineral acids and strong organic acids having a concentration of between 0.1% to 10% by weight, neutralizing the aqueous acidic extract to a pH of between 5 to 13, contacting the neutralized aqueous extract with activated carbon, separating the carbon absorbate, extracting the alkaloids from said carbon absorbate with an extraction fluid selected from the group consisting of (1) a dilute aqueous solution of an acid selected from the group consisting of strong mineral acids and strong organic acids having a concentration of between 0.1% and 10% by weight and containing from 0% to 10% by weight of an alkanol having from 1 to 6 carbon atoms and (2) an anhydrous solvent, and recovering said alkaloids in purified form.

These and other objects of the invention will become more apparent as the description thereof proceeds.

DESCRIPTION OF THE INVENTION

We have now discovered a new and novel process for the extraction of alkaloids and other nitrogenous substances from plants or animal tissues that eliminates the use of organic solvents as the extracting medium and simplifies the purification procedures for these materials. This process for the extraction and purification of alkaloids and nitrogenous compounds from plants and animal tissue comprises the steps of extracting plant and animal tissues having a low fat content with a dilute aqueous solution of an acid selected from the group consisting of strong mineral acids and strong organic acids having a concentration of between 0.1% to 10% by weight, neutralizing the aqueous acidic extract to a pH of between 5 to 13, contacting the neutralized aqueous extract with activated carbon, separating the carbon absorbate, extracting the alkaloids and nitrogenous compounds from said carbon absorbate with an extraction fluid selected from the group consisting of (1) a dilute aqueous solution of an acid selected from the group consisting of strong mineral acids and strong organic acids having a concentration of between 0.1% and 10% by weight and containing from 0% to 10% by weight of an alkanol having from 1 to 6 carbon atoms and (2) an anhydrous organic solvent, and recovering said alkaloids and nitrogenous compounds in purified form.

In the process of the invention, the alkaloids and nitrogenous compounds are first extracted from plants and animal tissue by the use of a dilute aqueous acid. The concentration of the extracting dilute aqueous acid should be between 0.1% and 10% by weight. The acid is preferably a strong mineral acid or a strong organic acid such as hydrochloric acid, sulfuric acid, nitric acid and acetic acid. The choice of the acid depends somewhat on the type of plant or animal tissue which is being extracted, however, in general any strong mineral or organic acid can be employed. It is preferable, particularly when extracting alkaloids from plant leafy material to employ hydrochloric acid in a concentration of 2% to 3% by weight. The amount of extracting liquid utilized should be sufficient to exhaust the plant or animal tissue of the alkaloids and/or nitrogenous compounds present therein. This amount is readily determined by those skilled in the art and should be kept to as low an amount as possible in order to avoid unnecessary expense in the subsequent neutralization step. We have found that ordinarily 5 to 20 parts by weight of extraction fluid should be employed per 1 part by weight of plant or animal tissue.

The process of the invention can be applied for the extraction of alkaloids from plant tissue or nitrogenous compounds from animal tissue. The plant tissue containing alkaloids can be leafy material, roots, bark, etc., and is usually reduced in particle size and dried to a low moisture content to facilitate extraction as is conventional. Among the various sources of alkaloids can be mentioned jaborandi leaves containing pilocarpine; ipecac (dried roots) containing emetine; cinchona (bark) containing the cinchona alkaloids, primarily quinine; opium (plant juice) containing the opium alkaloids, primarily morphine and codeine; ergot (fungus) containing the ergot alkaloids; belladonna plants and henbane plants containing the mydriatic alkaloids; etc. Plant and animal tissues can also be processed according to the invention to extract amines, proteins, amino acids and Vitamin B complexes.

If the plant or animal tissue contain plant or animal fat in excess of 0.5%, in some cases it is advisable to defat the same by conventional fat solvents before extracting the alkaloids or nitrogenous compounds in order to facilitate the extraction.

Where the alkaloid or nitrogenous material is present in the plant or animal tissue in the ester form, it occasionally is necessary and often preferable to treat the plant or animal tissue by moistening the same with a dilute aqueous alkaline solution, such as an alkali metal or ammonium hydroxide or carbonate, in order to release the alkaloid from the ester form to the free base before extracting with the dilute aqueous acid solution.

When this procedure is followed, it is preferable to moisten the plant or animal tissue with about a 1% solution of ammonium hydroxide utilizing about one half part by weight of alkaline solution to each part by weight of plant or animal tissue.

After one or more extractions of the plant or animal tissue with the dilute aqueous acid solution, the aqueous acidic extract is neutralized and the alkaloids or nitrogenous material contained therein is absorbed on activated carbon. The conditions for absorption are specific. The aqueous extract must be neutralized or made alkaline to a range of pH of 5 to 13. While the extract can be neutralized by a solution of an alkali metal or ammonium hydroxide or carbonate, it is preferable to utilize a 10% to 15% solution of ammonium hydroxide and neutralize to a pH of between 7 and 8. The activated carbon must be capable of absorbing free amines or cationic groups or charges. Under most circumstances about 5% of activated carbon based on the weight of the starting plant or animal tissue is sufficient. However, and in addition, the amount is also based upon the content of alkaloids.

After mixing or stirring for the proper time for absorption the carbon absorbate can be separated by filtration or decantation. For optimum absorption the aqueous extracts should be made neutral or alkaline. For example, from a pH value of 5.0 to 13.0. The amount of activated carbon varies according to the quantity and nature of the alkaloids. We have found that amounts of carbon equivalent to 0.1% to 10% of the weight of the plant or animal material is needed. Absorption is accomplished by stirring or mixing the carbon with the aqueous extract for a period of several hours or until the liquid is free from alkaloids. The carbon absorbate is now separated by filtration or decantation. The absorbate can be processed immediately or set aside for processing later. For the removal or elution of the alkaloids from the carbon either of two methods can be used. The process depends upon the nature of the materials being processed and the judgment of the operator.

Absorption of the alkaloid on the activated carbon is usually complete after one to three hours while agitating gently. The carbon absorbate is removed from the volume of liquid by filtration, decantation centrifuging or a combination of any or all these methods. Thereafter, it is preferable to wash the carbon asborbate with neutral to slightly alkaline water to remove impurities.

As stated, the alkaloids can be removed from the carbon by either of two ways. In one process the alkaloids can be eluted by stirring the carbon with acidulated water. The acidulated water can have an acid concentration of from 0.1% to 10% by weight of a strong mineral or organic acid such as hydrochloric acid, sulfuric acid, nitric acid, acetic acid, etc. In view of the fact that the alkaloid eluted from the carbon absorbate will be recovered ordinarily as the salt of the acid utilized, it is preferable to use a mineral acid such as a 2% to 3% solution of hydrochloric acid, sulfuric acid or nitric acid. The concentration and amount of the acid utilized for elution is not critical within the limits specified. Ordinarily, two to twenty five parts by weight of the acid solution per one part of weight of the carbon absorbate is sufficient.

In some cases, acid alone does not accomplish the elution from the carbon absorbate. In this event the elution can be expedited by adding from 0% to 10% of organic solvents such as any one of the alcohols of the aliphatic series from methanol to hexanol. The amount of acidulated water with or without organic solvent depends on the judgment of the operator.

The other process used for the elution of the alkaloids or nitrogenous compounds from the carbon absorbate consists of mixing or reacting the carbon absorbate with an organic liquid. This liquid may be any one of a series of alcohols, esters, ethers, glycols, aldehydes, ketones, hydrocarbons, halogenated hydrocarbons or nitrogen containing organic liquids. After mixing for the time required to accomplish the removal of the alkaloids from the carbon the mixture can be filtered. The alkaloids or nitrogenous compounds are now in the filtrate. Further purification or separation of the alkaloids or nitrogenous compounds depends upon the nature and character of these materials and is conducted according to conventional methods.

Although the precise chemical and physical factors that influence absorption and elution reactions are poorly understood, it is generally believed that one or more of the following properties are responsible; solvent effect, polarity of absorbent and eluting liquid, ion exchange processes, the pH of the reaction and surface tension.

After elution, the eluate is preferably filtered. The filtered solution contains the alkaloid or nitrogenous compounds in concentrated form and can be recovered by customary methods. The yields of the process of the invention vary according to the amount of the alkaloid or nitrogenous compounds in the plant or animal tissue. Recovery of 80% to 100% is, however, not uncommon.

The following examples are illustrative of the process of the invention. While these examples illustrate the extraction of pilocarpine from jaborandi leaves, the process can be applied to the extraction and purification of other alkaloids and nitrogenous compounds from plant and animal tissue as described above. It is to be understood that the following specific embodiments are not to be deemed limitative in any respect.

EXAMPLE 1

10 kilos of dried whole jaborandi leaves were placed in a conventional percolator. The leaves were then extracted two times, each time with 50 liters of a 3% aqueous hydrochloric acid solution. It was determined that 100% of the pilocarpine were extracted from the jaborandi leaves by analysis of the alkaloid content of the exhausted leaves. The extracts were combined and neutralized to a pH of between 7 and 8 with a concentrated ammonium hydroxide solution.

500 grams of activated carbon were added to the neutralized solution and the mixture was gently stirred for about three hours. Thereafter, the mixture was allowed to settle and the supernantant liquid was decanted. The carbon absorbate residue was filtered on a vacuum or pressure filter and washed with two one-liter aliquots of water having a pH of 7.5.

The moist carbon absorbate was then mixed with two liters of a 3% aqueous hydrochloric acid solution, drained, and again eluted with two liters of a 3% aqueous hydrochloric acid solution and drained. The extracts were combined and neutralized to a pH of between 7 and 8 with a basic solution of concentrated ammonium hydroxide solution or 10 to 20% sodium hydroxide and immediately extracted with one liter of chloroform. The organic layer (chloroform layer) now contains the alkaloid. The chloroform layer is placed in a distillation apparatus and the chloroform removed by distillation, To avoid danger of decomposition of the alkaloid a water bath was used as a heat sink. When all the chloroform had been taken overhead a tan or light brown oil remained. Sufficient alcohol was added to effect homogeneous solution and a mixture of 3 parts of ethanol to one part of 6 M nitric acid added dropwise until a pH of 5 to 7 had been reached. The mixture was concentrated to one-third the original volume, placed in the refrigerator overnight. A copious white precipitate of pilocarpine nitrate was isolated. The product was identical to the USP specifications without further purification. Yields of 80% to 100% of pilocarpine nitrate were recovered based on the pilocarpine content of the jaborandi leaves.

EXAMPLE II 10 kilos of partially-dried, comminuted jaborandi leaves were moistened with 5 liters of an aqueous 1% solution of ammonium hydroxide and allowed to stand for several hours in a percolator. The moistened leaves were then extracted two times, each time with 50 liters of a 3% aqueous hydrochloric acid solution. It was determined that 100% of the pilocarpine were extracted from the jaborandi leaves by analysis of the alkaloid content of the exhausted leaves. The extracts were combined and neutralized to a pH of between 7 and 8 with a concentrated ammonium hydroxide solution.

500 grams of activated carbon were added to the neutralized solution and the mixture was gently stirred for about three hours. Thereafter the mixture was allowed to settle and the supernantant liquid was decanted. The carbon absorbate residue was filtered on a vacuum filter and washed with two one-liter aliquots of water having a pH of 7.5.

The moist carbon absorbate was then mixed with two liters of a 3% aqueous hydrochloric acid solution, drained, and again eluted with two liters of a 3% aqueous hydrochloric acid solution and drained. The extracts were combined and neutralized to a pH of between 7 and 8 with a basic solution of concentrated ammonium hydroxide solution or 10 to 20% sodium hydroxide and immediately extracted with one liter of chloroform. The organic layer (chloroform layer) now contains the alkaloid. The chloroform layer is placed in a distillation apparatus and the chloroform removed by distillation. To avoid danger of decomposition of the alkaloid, a water bath was used as a heat sink. When all the chloroform had been taken overhead a tan or light brown oil remained. Sufficient alcohol was added to effect homogeneous solution and a mixture of 3 parts of ethanol to one part of 6 M nitric acid added dropwise until a pH of 5 to 7 had been reached. The mixture was concentrated to one-third its original volume, placed in the refrigerator overnight. A copious white precipitate of pilocarpine nitrate was isolated. The product was identical to the USP specifications without further purification. Yields of 80% to 100% of pilocarpine nitrate were recovered based on the pilocarpine content of the jaborandi leaves.

EXAMPLE III 10 kilos of dried whole jaborandi leaves were placed in a conventional percolator. The leaves were then extracted two times, each time with 50 liters of a 3% aqueous hydrochloric acid solution. It was determined that 100% of the pilocarpine were extracted from the jaborandi leaves by analysis of the alkaloid content of the exhausted leaves. The extracts were combined and neutralized to a pH of between 7 and 8 with a concentrated ammonium hydroxide solution.

500 grams of activated carbon were added to the neutralized solution and the mixture was gently stirred for about three hours. Thereafter, the mixture was allowed to settle and the supernatant liquid was decanted. The carbon absorbate residue was filtered on a vacuum filter and washed with two one-liter aliquots of water having a pH of 7.5.

The moist carbon absorbate was then mixed with one liter of ethyl alcohol, drained, and again eluted with one liter of ethyl alcohol and drained. The extracts were combined and concentrated under vacuum. A mixture of 3 portions of ethanol to one portion of 6 M nitric acid was added dropwise until a pH of 5 to 7 was achieved. The solution was again concentrated to one-third its original volume and placed in the refrigerator overnight. Raw crystalline pilocarpine nitrate was separated by filtration and purified by recrystallization from ethyl alcohol. Yields of 80% to 100% of pilocarpine nitrate were recovered based on the pilocarpine content of the jaborandi levaes.

EXAMPLE IV 10 kilos of dried whole jaborandi leaves were placed in a conventional percolator. The leaves were then extracted two times, each time with 50 liters of a 3% aqueous hydrochloric acid solution. It was determined that 100% of the pilocarpine were extracted from the jaborandi leaves by analysis of the alkaloid content of the exhausted leaves. The extracts were combined and neutralized to a pH of between 7 and 8 with a concentrated ammonium hydroxide solution.

500 grams of activated carbon were added to the neutralized solution and the mixture was gently stirred for about three hours. Thereafter, the mixture was allowed to settle and the supernatant liquid was decanted. The carbon absorbate residue was filtered on a vacuum filter and washed with two one-liter aliquots of water having a pH of 7.5.

The moist carbon absorbate was then mixed with two liters of a 2% aqueous hydrochloric acid solution containing 10% of isobutanol, drained, and again eluted with two liters of a 2% aqueous hydrochloric acid solution containing 10% of isobutanol and drained. The extracts were combined and concentrated under vacuum. The raw crystalline pilocarpine hydrochloride was separated by filtration and purified by recrystallization from ethyl alcohol. Yields of 80% to 100% of pilocarpine hydrochloride were recovered based on the pilocarpine content of the jaborandi leaves.

While no improvement in yield was obtained utilizing the variant of the process of the invention while extracting pilocarpine, the addition of organic solvents to the acidulated eluting liquor of lesser polarity than water ordinarily facilitates elution and this variant can be used in the purification of other alkaloids or amines.

The preceding specific embodiments are illustrative of the practice of the invention. It is obvious, however, that other expedients known to those skilled in the art can be employed without departing from the spirit of the invention or the scope of the appended claims.

We claim:

1. A process for the extraction and purification of pilocarpine from jaborandi leaves which comprises the steps of extracting jaborandi leaves with a dilute aqueous solution of hydrochloric acid, having a concentration between 2% to 3% by weight in a ratio of from 5 to 20 parts by weight of hydrochloric acid solution per one part by weight of jaborandi leaves, neutralizing the aqueous extract to a pH of between 7 and 8, contacting the neutralized aqueous extract with from 0.1% to 10% of activated carbon based on the weight of said jaborandi jaborandi leaves, separating the carbon absorbate, extracting pilocarpine from said carbon absorbate with an extraction fluid selected from the group consisting of (1) a dilute aqueous solution of an acid selected from the group consisting of hydrochloric acid, sulfuric acid and nitric acid having a concentration of between 2% and 3% by weight and containing from 0% to 10% by weight of an alkanol having from 1 to 6 carbon atoms and (2) an anhydrous organic solvent, and recovering of said pilocarpine in purified form.

2. The process of claim 1 wherein said jaborandi leaves are first moistened with a 1% solution of ammonium hydroxide.

3. The process of claim 1 wherein said extraction fluid extracting said carbon absorbate is said dilute aqueous solution of an acid and containing from 0% to 10% by weight of an alkanol having from 1 to 6 carbon atoms and said dilute aqueous solution is utilized in a ratio of from 2 to 25 parts by weight of extraction fluid per one part by weight of said carbon absorbate.

4. The process of claim 3 wherein said extraction fluid is a 2% to 3% aqueous solution of hydrochloric acid.

5. The process of claim 3 wherein said extraction fluid is a 2% to 3% aqueous solution of hydrochloric acid containing from 1% to 10% of an alkanol having from 1 to 6 carbon atoms.

6. The process of claim 1 wherein said extraction fluid extracting said carbon absorbate is an anhydrous organic solvent.

7. The process of claim 6 wherein said anhydrous organic solvent is ethanol.

References Cited

UNITED STATES PATENTS

| | | | |
|---|---|---|---|
| 2,481,237 | 9/1949 | Ronzone | 260—284 |
| 2,504,847 | 4/1950 | Koepfli et al. | 260—236 |
| 2,509,051 | 5/1950 | Applezweig | 260—284 |
| 2,752,351 | 6/1956 | Schlittler | 260—236 R |
| 2,866,784 | 12/1958 | Gillo | 260—236 |

FOREIGN PATENTS

| | | | |
|---|---|---|---|
| 856,316 | 12/1960 | Great Britain | 260—236 R |

OTHER REFERENCES

Bentley, The Alkaloids, vol. 1, p. N.Y., Interscience, 1957.

Manske et al., The Alkaloids, vol. 1, pp. 1 and 7–9, N.Y., Academic Press, 1949.

Kirk et al., Encyclopedia of Chemical Technology, vol. 1, p. 514, N.Y., Interscience, 1947.

Kirk-Othmer Encyclopedia of Chemical Technology, 2nd ed., vol. 1, pp. 779–81, N.Y., Wiley, 1963.

NATALIE TROUSOF, Primary Examiner

U.S. Cl. X.R.

260—236 R, 284, 285, 285.5, 287 E, 288 E